Aug. 18, 1970     A. J. MISENTI     3,525,003
DYNAMOELECTRIC MACHINE AIR BEARING
Filed July 3, 1968
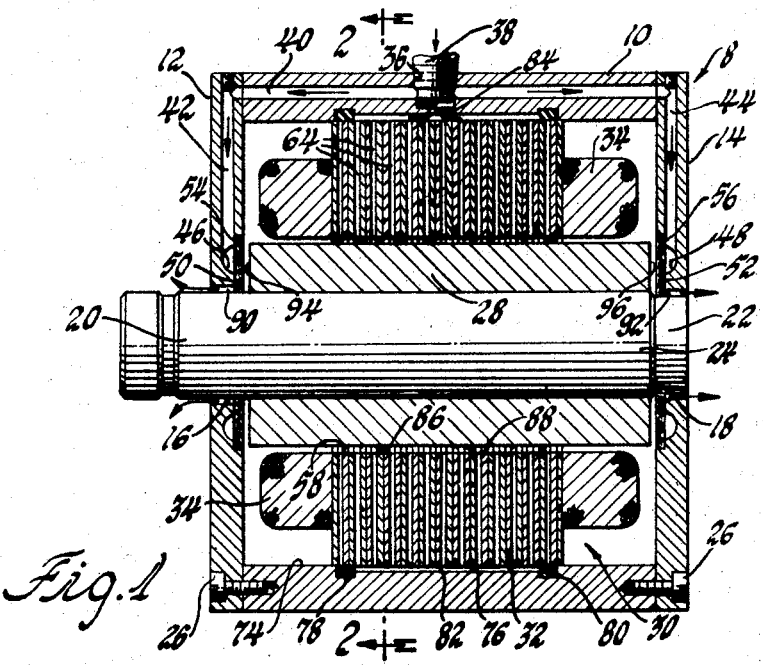
Fig.1
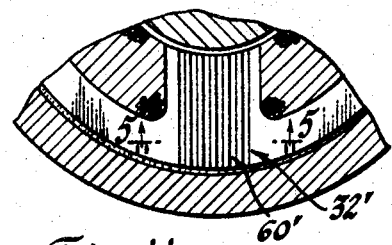
Fig.3
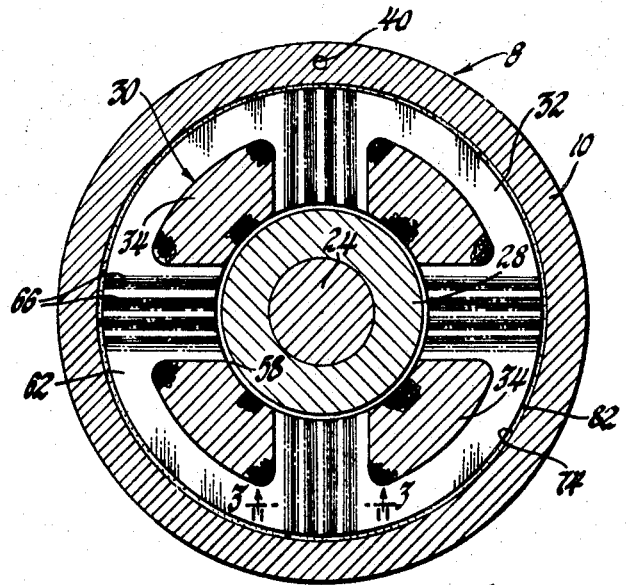
Fig.2
Fig.4
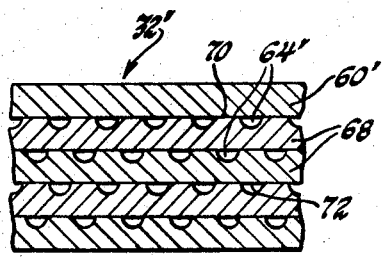
Fig.5
INVENTOR.
Angelo J. Misenti
BY
C. L. Eugle
ATTORNEY United States Patent Office 3,525,003
Patented Aug. 18, 1970

3,525,003
DYNAMOELECTRIC MACHINE AIR BEARING
Angelo J. Misenti, Simsbury, Conn., assignor to General Motors Corporation, Detroit, Mich., a corporation of Delaware
Filed July 3, 1968, Ser. No. 742,454
Int. Cl. H02k 1/20, 5/16, 5/20
U.S. Cl. 310—90                                    8 Claims

ABSTRACT OF THE DISCLOSURE

A dynamoelectric machine including inductively associated rotor and stator members wherein the stator member comprises a laminated portion having radial passages therethrough for supplying pressurized air to the magnetic gap therebetween. These radial passages being formed by either machining the laminate plates or by deforming the plates such that stacking them together forms the desired radial passages. Pressurized air discharging from the magnetic gap air bearing is also utilized to form air bearings at the ends of rotor drive shaft where they are respectively supported in the machine housing. The dynamoelectric machine housing and end plates also include passages disposed to direct pressurized air against the opposite ends of the rotor forming thrust air bearing pads automatically axially centering the rotor within the housing.

---

This invention relates to an air bearing for a dynamoelectric machine and more specifically to an air bearing in the magnetic gap between the rotor and stator members, the air being supplied thereto through radial passages in laminations of one of these members.

In high speed electric motors or dynamoelectric machines, bearing life is a significant factor when it is desired to run the machine over an extended period of time. In this respect, air bearings are advantageous because of their inherent low coefficient of friction. It is a purpose of this invention to increase the operating life of high speed dynamoelectric machines through the utilization of air bearings. More specifically, it is the purpose of this invention to provide air bearings which not only reduce friction between moving parts but also are effective to axially align the components during operation thereof.

An object of this invention is to provide an improved dynamoelectric machine. A more particular object of this invention is the provision of an air bearing in the magnetic gap of a dynamoelectric machine maintaining the stator and rotor members in a predetermined spaced relationship with a low coefficient of friction therebetween.

A further object of this invention is to provide a dynamoelectric housing containing air passages directing pressurized air against opposite ends of the rotor to axially position the same.

Another object of this invention is the provision of radial passages through a laminated rotor or stator supplying pressurized air to the magnetic gap.

A further object of this invention is to provide air bearings in annular spaces between the rotor shaft ends and the housing end walls by discharging air from the magnetic gap therethrough.

Another object of this invention is the provision of an axially shortened dynamoelectric machine utilizing air bearings between rotating and stationary components.

A still further object of this invention is to provide air bearings in a dynamoelectric machine wherein the pressurized air also cools the operational components.

In the drawings:

FIG. 1 is a sectional view taken substantially longitudinally of a dynamoelectric machine made in accordance with this invention.

FIG. 2 is a sectional view taken on lines 2—2 of FIG. 1.

FIG. 3 is a fragmentary sectional view taken on lines 3—3 of FIG. 2.

FIG. 4 is a fragmentary sectional view of a modification of the dynamoelectric machine made in accordance with this invention.

FIG. 5 is a fragmentary sectional view taken on lines 5—5 of FIG. 4.

A dynamoelectric machine 8 including a cylindrical housing member 10 enclosed by end plates 12 and 14 is shown in FIG. 1. The end plates 12 and 14 contain apertures 16 and 18 which respectively receive ends 20 and 22 of drive shaft 24. The end plates 12 and 14 are secured to the cylindrical body member 10 by conventional screws 26. The drive shaft 24 has rotor 28 fixed thereon which is in turn disposed within stator assembly 30 which is composed of a laminated portion 32 and windings 34.

The cylindrical housing member 10 contains a drilled and tapped hole 36 which receives a threaded pipe 38 for a purpose later to be described. The tapped hole 36 connects with axially extending passages 40 in the housing member 10 that in turn are connected with radial passages 42 and 44 in end plates 12 and 14. The radial passages 42 and 44 terminate in annular cavities 46 and 48 which in preferred form receive porous thrust pad members 50 and 52 which are annular in form and are received within annular machined recesses 54 and 56. As illustrated in the drawings, the rotor 28 is concentrically disposed within stator 30 with a magnetic gap 58 therebetween.

Referring to FIG. 3, the stator laminated portion 32 is comprised of adjoining steel lamination sheets 60 and 62 which are stacked together to form radial passages 64. The sheets 60 are planar in form while the sheets 62 are stamped or otherwise formed with undulations 66 so that the alternate angulations engage alternate plates 60 to form the aforementioned passages 64. A modified form of the laminated portion 32′ is shown in FIGS. 4 and 5 and in this embodiment, a steel sheet 60′ is used to cap off a stack of plates 68, each having grooves on one side 70 to form a plurality of radial air passages 64′. The grooved plates 68 also have a planar face 72 which engages the grooved side 70 of an adjoining plate 68 thereby forming the radial air passages 64′ as the laminations are stacked together.

When the laminated stator portion 32 is assembled within the cylindrical body member 10, the radially extending air passage 64 connect with air gap 58 between the rotor 28 and stator assembly 30. The interior surface 74 of cylindrical housing member 10 is machined to form an annular recess 76 which is further machined to contain grooves 78 receiving O-rings 80 tightly engaging the laminated portion 32 and forming a fluid tight chamber 82 therebetween. The drilled and tapped hole 36, in housing member 10 is in fluid communication with the annular recess 76 by means of passage 84.

In operation, pressurized air is supplied through the fitting 38 to the fluid tight chamber 82 from which the air passes through radially extending passages 64 to magnetic gap 58 between the rotor 28 and stator assembly 30. The adjacent surfaces of the rotor 28 and the laminated section 32 together form bearing surfaces 86 and 88 which in combination with the pressurized air flowing into the magnetic gap 58 form an air bearing between the rotor and the stator. The solid adjoining portions of the steel sheets 60 and 62 may be coated with an epoxy resin to form improved bearing surfaces around the air passages 64. During initial rotation of rotor 28 the epoxy coating maintains a slight gap between the rotor and stator while providing a desirable low friction surface contact. The pressure air leaves the magnetic gap and is discharged through annular cavities 90 and 92 formed between end cap apertures 16 and 18 and the respective shaft ends 20 and 22 whereby air bearings are formed between the shaft ends and the housing fluidly supporting the rotor within the housing. Additionally, pressurized air entering housing member 10 is directed through longitudinal passages 40 to the radially extending passages 42 and 44 and consequently to the annular cavities 46 and 48. The air then passes through thrust pads 50 and 52 and is directed against end surfaces 94 and 96 of rotor 28 to maintain the rotor axially aligned within the housing member 10.

From the above description, it is obvious that the grooves in the steel sheets forming the laminated portion 32 of the stator 30 could be formed in various ways to direct pressurized air to the magnetic gap 58. Utilization of a laminated rotor containing air passages in association with a solid stator is within the scope of this invention. It is further obvious that the number of radially extending passages and their respective sizes can be varied in accordance with any design requirement. While one embodiment of the thrust pads 50 and 52 have been shown for purposes of description only, it is also obvious that any porous material or annular cavity arrangement could be used as long as a sufficient quantity of pressurized air is discharged against the ends 94 and 96 of rotor 28 to maintain it in axial alignment.

The advantages of this invention are readily apparent from the previous description, however it is of particular significance that the flow of air through the radial passages in the stator not only supports the rotor in an almost frictionless manner, but also cools these components as the air flows therearound. Since a preferred embodiment of this invention has been described for purposes of illustration only, it is therefore not intended to limit the scope of this invention except as required by the appended claims.

I claim:

1. In a dynamoelectric machine, the combination of a housing enclosing a rotor and a laminated stator, a drive shaft fixed to said motor and extending from said housing, said rotor being concentrically disposed within said stator in a spaced relationship defining a magnetic gap therebetween, said stator including a bearing surface, said rotor including a bearing surface cooperating with said stator bearing surface in said magnetic gap, said housing cooperating with the exterior surface of said stator forming a sealed annular air chamber therearound, said housing containing an aperture connecting with said chamber and a source of air under pressure, and a plurality of radially extending passages in said stator laminations conveying pressurized air from said chamber through said stator to said magnetic gap whereby said rotor and stator bearing surfaces in cooperation with the pressurized air form an air bearing between said rotor and said stator.

2. In a dynamoelectric machine, a combination including a housing comprising a cylindrical body member, first and second end caps enclosing said body member, a laminated stator disposed within said body member, a rotor concentrically located within said stator defining a magnetic gap therebetween, said stator including a bearing surface, said rotor including a bearing surface cooperating with said stator bearing surface in said magnetic gap, a drive shaft connected to said rotor having end portions rotatably supported in said first and second end caps, said body member containing an annular cylindrical recess overlying said stator laminations, annular member sealingly engaging said body member and said stator adjacent the axial extremities of said stator and in conjunction with said cylindrical recess and said stator lamination forming an air chamber therebetween, said chamber being supplied with pressurized air from an outide source through a radial bore in said cylindrical body member, a plurality of radial passages formed in said stator laminations conveying the pressurized air from said air chamber to said magnetic gap whereby said stator bearing and said rotor bearing surfaces are subjected to the pressurized air and form an air bearing between said rotor and said stator, and passage means in said cylindrical body member and said ends caps conveying pressurized air against the ends of said rotor providing air thrust bearings at the respective ends thereof.

3. In a dynamoelectric machine, the combination of a rotor member inductively associated with a stator member and one of said members substantially enveloping the other member defining a magnetic gap therebetween, one of said members being laminated, said laminated member comprising stacked steel plates having at least one surface in engagement with a surface of an adjoining plate, one of said engaging surfaces having a configuration cooperating with the other said surface forming a plurality of radially extending passages through said laminated member, a housing enclosing said rotor and stator members, and means supplying pressurized air to said lamination passages whereby air flows into said magnetic gap forming an air bearing between said rotor and stator members.

4. In a dynamoelectric machine as described in claim 3 wherein said laminated member comprises alternate stamped undulated plates and planar flat plates in juxtaposed relationship to form the radially extending passages therethrough.

5. In a dynamoelectric machine as described in claim 3 wherein said laminated member comprises a plurality of plates having a plane side and having radially extending grooves formed in the other side thereof which are stacked together so that the grooved side abuts the plane side of an adjacent plate forming closed radially extending air passages therethrough.

6. In a dynamoelectric machine as described in claim 3 comprising a drive shaft having its respective ends rotatably supported by said housing, and annular clearance passages between said shaft ends and said housing whereby pressurized air flows from said magnetic gap and exits from said housing circumferentially of said drive shaft ends through said clearance passages forming air bearings between said shaft ends and said housing.

7. In a dynamoelectric machine as described in claim 3 wherein said housing enclosing said rotor and said stator members includes passage means directing pressurized air through thrut bearing pads against the opposite ends of said rotor thereby forming air thrust bearings at the respective ends of said rotor between said housing member.

8. In a dynamoelectric machine as described in claim 7 wherein said passage means includes at least one axial passage in said houssng, said housing including end plates supporting the ends of said drive shaft, thrust pads in said end plates disposed circumferentially of said shaft ends in alignment with the ends of said rotor, and radial passages in said end plates connecting with said axial passage and said thrust pads.

References Cited

UNITED STATES PATENTS

| 1,121,014 | 12/1914 | Hobart | 310—52 |
| 1,135,327 | 4/1915 | Savage | 310—52 |
| 2,928,960 | 3/1960 | Macks | 310—90 |
| 2,937,294 | 5/1960 | Macks | 310—90 |
| 3,004,180 | 10/1961 | Macks | 310—90 |
| 3,110,527 | 11/1963 | Fox | 308—122 |
| 3,356,425 | 12/1967 | Carriere et al. | 308—10 |

WARREN E. RAY, Primary Examiner

U.S. Cl. X.R.

310—59